United States Patent
Jones et al.

(10) Patent No.: US 7,677,324 B2
(45) Date of Patent: Mar. 16, 2010

(54) TURF SLICER WITH VERTICAL OSCILLATOR

(75) Inventors: Donald C. Jones, Tifton, GA (US); Carroll J. Whitfield, Tifton, GA (US); Robert Funk, Sycamore, GA (US)

(73) Assignee: First Products, Inc., Tifton, GA (US)

( * ) Notice: Subject to any disclaimer, the term of this patent is extended or adjusted under 35 U.S.C. 154(b) by 457 days.

(21) Appl. No.: 11/500,620

(22) Filed: Aug. 8, 2006

(65) Prior Publication Data

US 2008/0035355 A1    Feb. 14, 2008

(51) Int. Cl.
*A01B 33/02* (2006.01)
(52) U.S. Cl. ............................. 172/97; 172/21; 172/125
(58) Field of Classification Search .................. 172/21, 172/22, 89, 94, 97, 125; 403/383
See application file for complete search history.

(56) References Cited

U.S. PATENT DOCUMENTS

| | | | | | |
|---|---|---|---|---|---|
| 22,496 | A | * | 1/1859 | Field | 172/89 |
| 131,160 | A | * | 9/1872 | Forsgard | 172/97 |
| 1,171,798 | A | * | 2/1916 | Malcor | 172/184 |
| 1,319,936 | A | * | 10/1919 | Wentworth | 171/91 |
| 1,424,728 | A | * | 8/1922 | Knight et al. | 111/128 |
| 1,479,188 | A | * | 1/1924 | Larson | 172/54 |
| 1,702,707 | A | * | 2/1929 | Sleffel | 172/21 |
| 2,034,505 | A | * | 3/1936 | Cline | 172/21 |
| 2,205,752 | A | * | 6/1940 | Silver | 172/63 |
| 2,206,264 | A | * | 7/1940 | Rose | 172/21 |
| 2,539,053 | A | * | 1/1951 | Blackledge | 172/549 |
| 2,827,751 | A | * | 3/1958 | Mascaro | 56/249 |
| 2,881,847 | A | * | 4/1959 | Strasel | 172/21 |
| 3,214,996 | A | * | 11/1965 | Bono | 74/568 R |
| 3,292,946 | A | * | 12/1966 | Melson | 280/229 |
| 3,739,856 | A | * | 6/1973 | Ray | 172/21 |
| 3,747,687 | A | * | 7/1973 | Bodine | 172/40 |
| 4,202,415 | A | * | 5/1980 | Barlage | 172/125 |
| 4,204,576 | A | * | 5/1980 | Mullet et al. | 172/22 |
| 4,364,423 | A | * | 12/1982 | Schilling | 144/366 |
| 4,602,822 | A | * | 7/1986 | Kim et al. | 301/1 |
| 4,724,662 | A | * | 2/1988 | Giandenoto et al. | 56/256 |
| 5,142,852 | A | * | 9/1992 | Nelson | 56/16.6 |
| 5,207,278 | A | * | 5/1993 | Hatlen | 172/22 |
| 5,209,306 | A | * | 5/1993 | Whitfield | 172/21 |
| 5,396,962 | A | * | 3/1995 | Reincke | 172/604 |
| 6,561,282 | B2 | * | 5/2003 | Smith | 172/21 |
| 6,607,039 | B2 | * | 8/2003 | Simon | 172/22 |

(Continued)

*Primary Examiner*—Thomas B Will
*Assistant Examiner*—Jamie L McGowan
(74) *Attorney, Agent, or Firm*—Thomas, Kayden, Horstemeyer & Risley, LLP (57) ABSTRACT

A turf slicer includes a gang of six slicer wheels that "walk" through the turf in response to the forward motion of the turf slicer. In the meantime, the power takeoff from the tractor vertically oscillates the slicer wheels out of phase with one another, so that every sixth wheel is being thrust downwardly to bear most of the weight of the turf slicer as the other five wheels in the gang of six are either being withdrawn upwardly or moved downwardly and do not bear much weight, so that the weight of the turf slicer is concentrated on the downwardly moving slicer wheel that is approaching bottom dead center of its movement, thereby amplifying the effective weight of the turf slicer against the turf below.

15 Claims, 6 Drawing Sheets

U.S. PATENT DOCUMENTS

2002/0043376 A1* 4/2002 Smith .......................... 172/21
2004/0200625 A1* 10/2004 Petersen et al. ............... 172/21
2006/0070748 A1* 4/2006 Faltysek ...................... 172/21
2006/0070749 A1* 4/2006 Simon et al. .................. 172/21

* cited by examiner

TURF SLICER WITH VERTICAL OSCILLATOR

FIELD OF THE INVENTION

This invention concerns a method and apparatus for aerating the roots of grass and other ground cover and vegetation, all generally referred to herein as turf, by forming a pattern of holes extending into the turf to the roots of the turf.

BACKGROUND OF THE INVENTION

The exposure of the root structure of turf to air, moisture and nutrients tends to stimulate root growth. Aeration of turf by forming openings through the upper surface down to the roots tends to disturb the soil and roots beneath the surface of the ground cover. When moisture and fertilizer are applied through the openings, the root structure of the turf is able to directly absorb these nutrients, etc.

Some of the prior art aerators have a plurality of radially extending spikes or tines that are mounted on the perimeter surface of a cylindrical drum or other structure so that when the structure is rolled on the surface of the turf, the tines penetrate the surface of the turf. While this is one of the preferred methods of aerating turf, etc., there are times when the users of the turf wish to avoid unnecessary disruption of the surface of the turf that is caused by the tines during penetration, tilting and withdrawal of the tines from the turf. The relatively large openings remaining in the turf and some of the soil lifted out of the turf may be somewhat unsightly and may leave an undesirable residue on the surface of the turf.

In order to avoid these problems, aerators have been developed that comprise thin, flat blades that are oriented perpendicular to the axis of rotation of the supporting drum or other supporting structure, so that the blades tend to slice directly into the turf and then withdraw from the turf so as to minimize the surface disruption of the turf. While openings are left behind after the aerator blades have been withdrawn from the turf, the openings are more in the form of narrow slits that may be substantially invisible to the casual eye and little residue remains on the surface of the turf.

It is desirable that a multiple number of the slicer wheels be mounted on a common axle for the aerator so that a dense pattern of the slices formed in the turf can be accomplished. However, the amount of power and the weight required to operate a densely packed array of slicer blades might not be sufficient for full penetration of the slicer blades, since the more slicer blades that engage the turf at one time, the heavier the force must be to cause full penetration of the slicer blades.

Thus, it can be understood that it would be desirable to have a turf aerator that utilizes slicer wheels with a large number of slicer blades being employed and with the ability to more easily have the slicer blades fully penetrate the turf. It is to this improvement that this invention is directed.

SUMMARY

Briefly described, the present invention comprises a turf slicer for penetrating and aerating turf, including a support frame, a drive shaft rotatably supported by the support frame, and power takeoff means arranged to rotate the drive shaft. A series of slicer wheels, each including a plurality of radially extending slicer blades, are rotatably supported on the drive shaft. The slicer blades for this aerator may be mounted in a plurality of slicer wheels with each slicer wheel including several slicer blades. The slicer blades are positioned in substantially the same plane and extend radially at equal angles from one another about the central axis of the slicer wheel so that the slicer blades closely follow one another into the soil as the slicer wheels "walk" through the turf in response to the advancement of the support frame and penetrate the turf.

Hubs that have circular perimeters mount each slicer wheel to the drive shaft. Each slicer wheel freely rotates about its own hub. Each circular hub has an off-center opening that is non-rotatably mounted on the drive shaft so that the arcuate portion of the perimeter of each hub that is most remote from the off center opening forms a lobe. When the hubs are mounted with their off center opening on the drive shaft, the lobes protrude from drive shaft. When the drive shaft rotates, the lobes oscillate about the drive shaft.

The hubs are mounted on the drive shaft in an arrangement so that the lobes of the adjacent ones of the circular hubs extend in different radial directions from the drive shaft, such that when the drive shaft is rotated, the lobes of the circular hubs cause the slicer wheels to oscillate out of phase with one another about the drive shaft. This causes the downwardly extending slicer blades of the slicer wheels to penetrate the turf at different times.

The series of slicer wheels include duplicate slicer wheels, each having radially extending flat slicer blades that in turn penetrate the turf below the support frame. The slicer blades are flat, and may extend substantially perpendicular to the drive shaft of the support frame.

For the purpose of holding the hubs in fixed positions on the drive shaft, the drive shaft may be non-circular in cross section. The non-circular shape can be hexagonal, octagonal, square or other multilateral shapes in cross section that have flats formed about the perimeter of the drive shaft, or other shapes that can hold the hubs on the drive shaft.

The offset center openings of the hubs are of a shape that corresponds to the external shape of the drive shaft so that the hubs rotate in unison with the drive shaft.

The circular hubs may be oriented on the drive shaft so that their lobes extend away from a flat on the drive shaft, with the lobes of at least some of the hubs mounted to extend away from flats extending at different radial directions than the next adjacent lobes. This causes the adjacent slicer wheels to oscillate out of phase with one another so that, for example, when one slicer wheel is moving downwardly, an adjacent slicer wheel might be moving laterally or upwardly. This out of phase arrangement allows the full weight of the support frame and components carried by the support frame to apply their full weight to a minimum number of the blades of the slicer wheels, so that the minimum number of blades can be thrust at a greater force than would be available if all the slicer wheels were urged simultaneously into the turf.

The invention further includes the method of aerating turf, and includes the steps of advancing the support frame on the turf, supporting a plurality of slicer wheels on a drive shaft of the support frame with the slicer wheels having slicer blades radiating therefrom and penetrating the turf. In response to advancing the support frame, the slicer wheels are rotated about the drive shaft by the engagement with the turf, such that the slicer blades of the slicer wheels continually penetrate and withdraw from the turf. When the drive shaft is rotated, the slicer wheels are oscillated in vertical planes about the drive shaft with different ones of the slicer wheels oscillating out of phase with each other and the slicer blades of different slicer wheels are urged into the soil at different times.

With this arrangement, the weight applied by the support frame and the equipment carried thereby can be concentrated on fewer than all of the slicer wheels at one time as the slicer wheels enter the turf. For example, if the drive shaft that oscillates the slicer wheels is hexagonal, having six flats in cross section, six circular hubs having off set openings that match the shape of the drive shaft can be oriented so that the protruding lobes of the circular hubs extend from different ones of the flats of the drive shaft. If there are six flats, the lobes of six circular hubs can extend in six different directions so that approximately only one-sixth of the slicer wheels are being directly urged into the turf. This effectively multiplies the downward force applied to the slicer wheels by almost six times.

DETAILED DESCRIPTION

Figure 1:
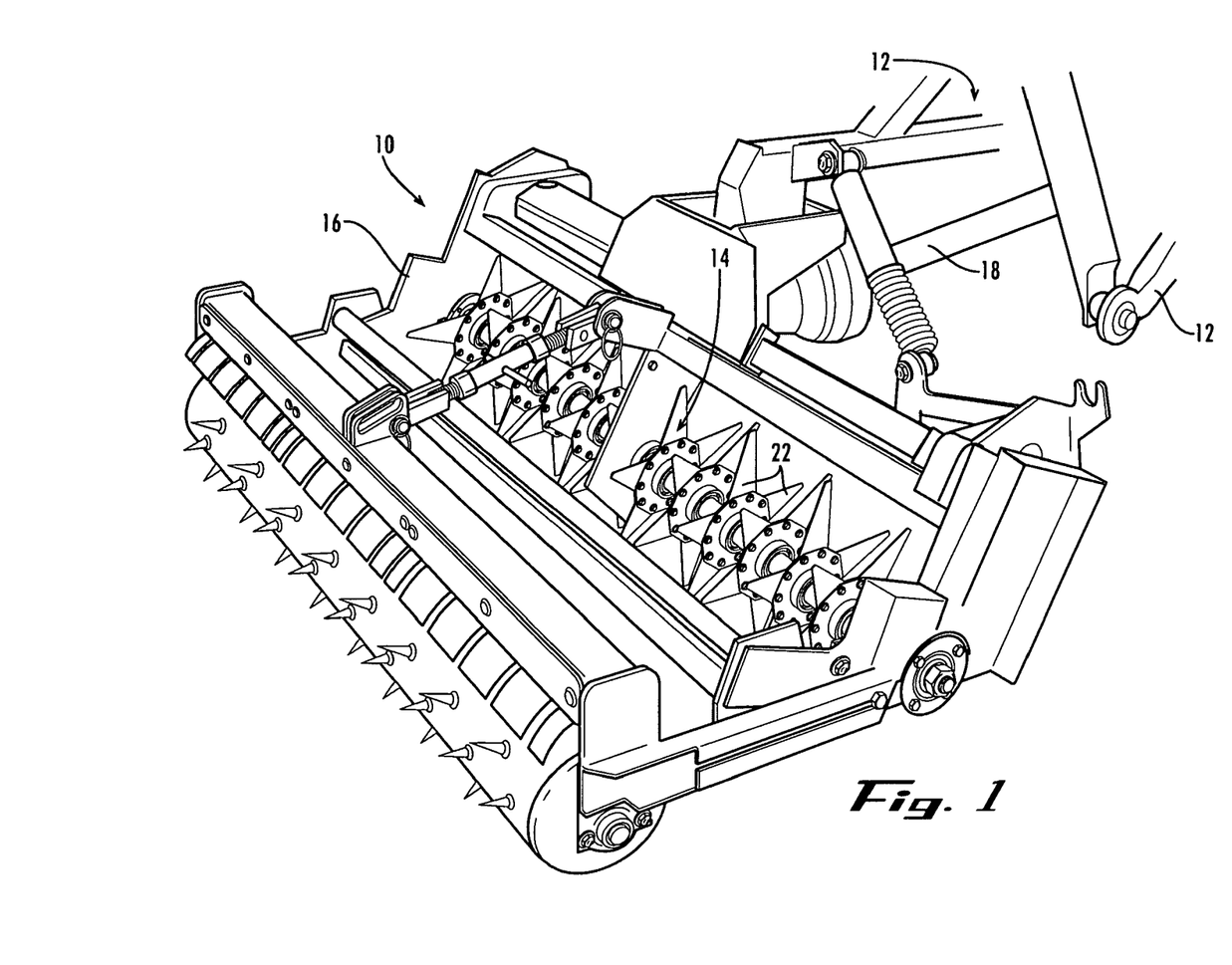
FIG. 1 is a perspective view of the turf slicer.

Referring now in more detail to the drawings, in which like numerals indicate like parts throughout the several views, FIG. 1 shows a turf slicer 10 that is mounted to the rear of a towing vehicle, such as tractor 12. A gang of slicer wheels 14 is mounted to the support frame 16 of the turf slicer, and a power takeoff 18 of the turf slicer is connected to the power shaft of the tractor 12. The power shaft and power takeoff are used to oscillate the gang of slicer wheels 14, as will be described hereinafter.

Figure 2:
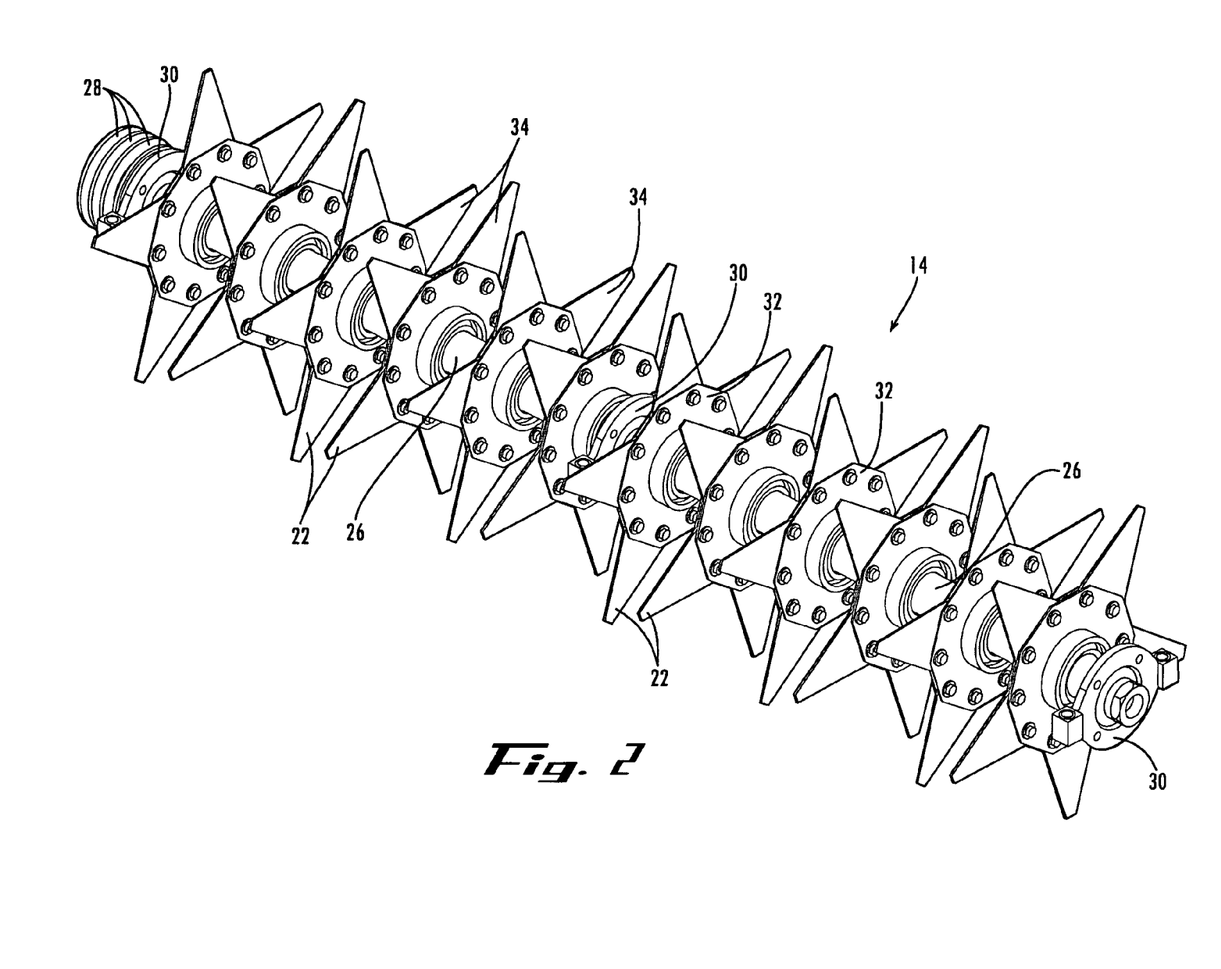
FIG. 2 is a perspective view of the gang of slicer wheels mounted on a common axle.

FIG. 2 shows the gang of slicer wheels 14, which includes a series of slicer wheels 22 arranged on a common drive shaft 24 (FIG. 3), with tubular spacers 26 positioned about the drive shaft, between the slicer wheels, so as to maintain proper spacing between the slicer wheels. A sheave 28 is mounted to the drive shaft 24 at one end of the drive shaft, and the drive shaft is supported at its ends and intermediate its ends by bearings 30. The bearings, in turn, are mounted to the support frame 16, as generally indicated in FIG. 1.

Figure 3:
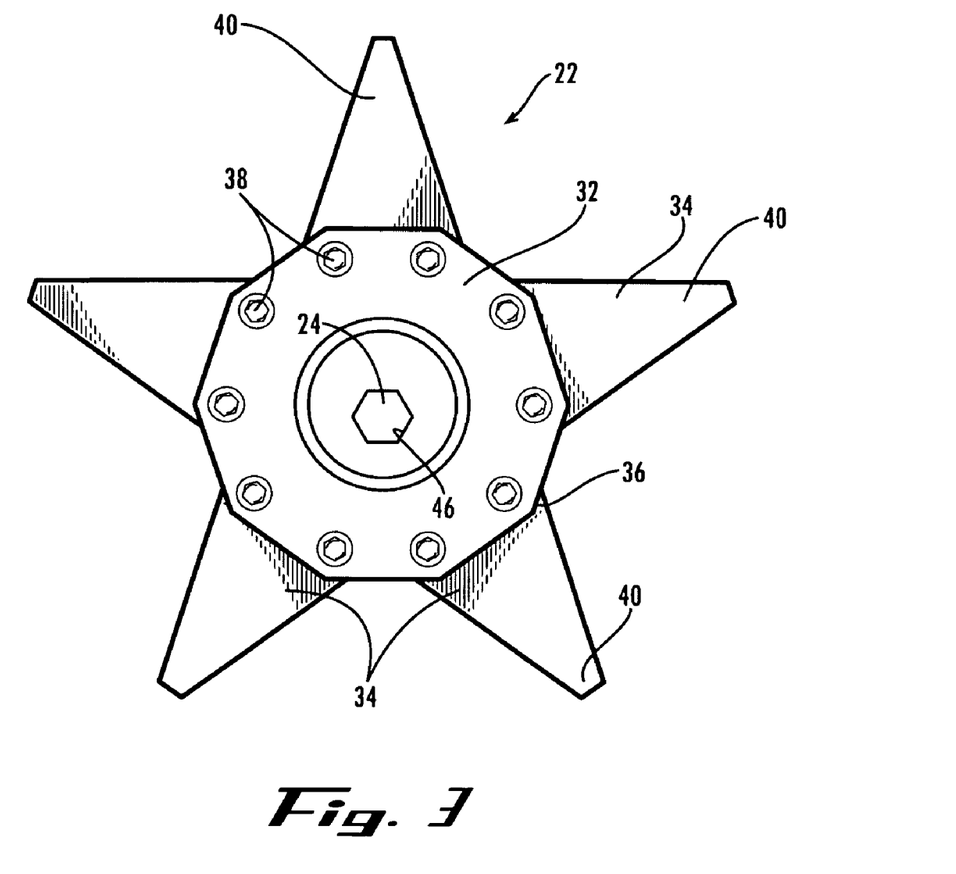
FIG. 3 is a side elevational view of one of the slicer wheels, showing the drive shaft offset from the center of the circular hub.
Figure 4:
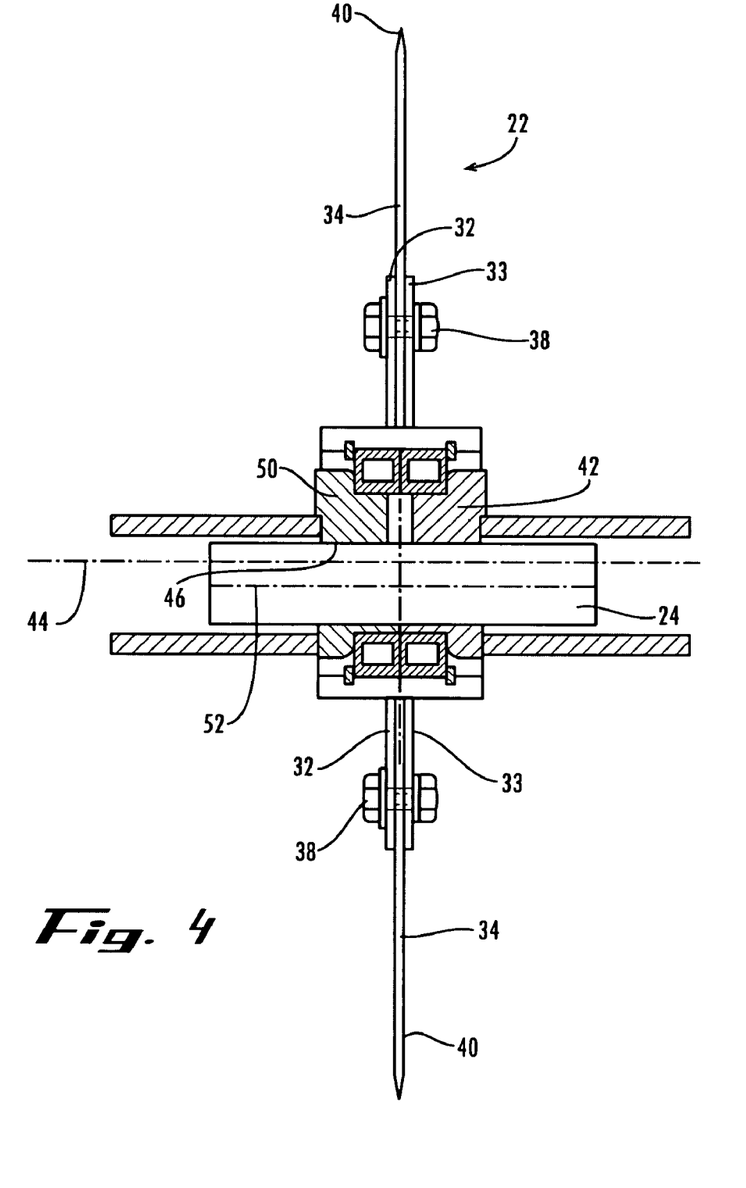
FIG. 4 is a front cross-sectional view of one of the slicer wheels.
Figure 5:
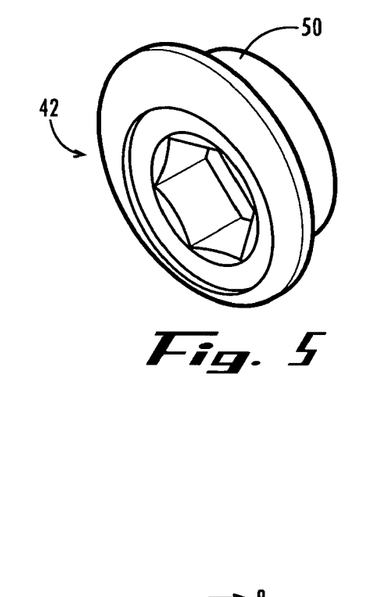
FIG. 5 is a perspective view of one of the circular hubs, showing the enlarged surface of the circular hub.
Figure 6:
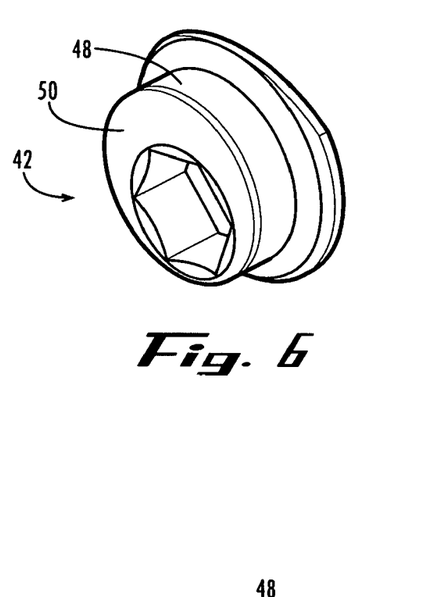
FIG. 6 is a perspective view of the circular hub, showing the small side of the circular hub.
Figure 7:
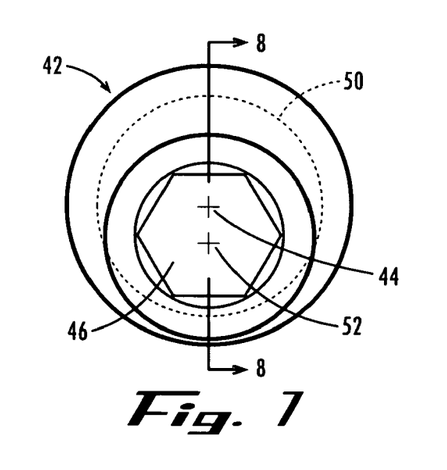
FIG. 7 is a plan view of the circular hub of FIGS. 5 and 6.
Figure 8:
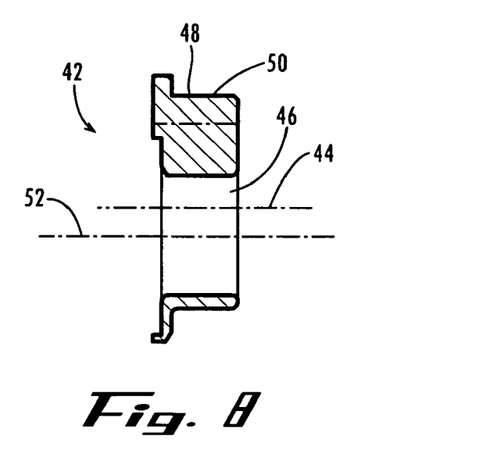
FIG. 8 is a side cross-sectional view of the circular hub of FIG. 7.

As illustrated in FIGS. 3 and 4, each slicer wheel 22 includes a pair of superposed support plates 32 and 33, with slicer blades each having a broad base portion 36 positioned between the support plates and mounted thereto by bolts, rivets or other connectors 38. The slicer blades are flat and are tapered to a narrow distal end 40.

The support plates 32 each define a large circular central opening, and circular hub 42 fills the opening and forms a perimeter bearing surface with respect to the support plate so that the slicer wheels can freely rotate about circular hub 42 on the central axis 44 of the circular hubs.

The circular hub 42 defines an offset center opening 46 that conforms to the shape of the exterior surface of drive shaft 24.

In the embodiment illustrated in FIGS. 3 and 9-14, the drive shaft 24 is hexagonal, having six flat, equal sized surfaces. The drive shaft 24 and the circular hubs 42 rotate in unison with each other in response to the rotation of the drive shaft 24.

The circular hubs 42 are shown in more detail in FIGS. 5-8. The circular hubs each have a circular perimeter 48 and an offset opening 46 that is off set from the central axis 44 of the hub. Thus, the circular hubs include a lobe 50 that protrudes farther from the axis of rotation 52 of the drive shaft 24 (FIG. 4), so that upon rotation of the circular hub, a loping effect for the circular hubs is created.

As progressively shown in FIGS. 9-14, each circular hub 42A-42F has its lobe 50 spaced farther from the axis of rotation 52 than the other side of the circular hub so that the lobe oscillates around the axis of rotation 52.

When the turf slicer 10 is assembled as shown in FIGS. 1 and 2, the slicer blades 34 will be lowered so that they engage the turf or other lower surface. As the tractor 12 moves in a forward direction, the slicer wheels engage the turf, thereby causing the slicer wheels to rotate in unison with the forward movement of the towing vehicle, such that the slicer wheels tend to "walk" through the turf. The slicer wheels are free to rotate about the circular hubs 42. The forward movement of the towing vehicle and the "walking" of the slicer wheels through the turf is not in response to the rotation of the circular hubs 42.

In the meantime, the operator of the towing vehicle may actuate the power shaft so that the coupling of the power shaft to the power takeoff of the turf slicer causes the drive shaft 24 and central hubs 42A-42F to rotate as indicated by arrows 56 in FIGS. 9-14. The numeral 50 that is applied to the circular hubs 42A-42F indicates the position of the lobe of each hub and how the lobes are out of phase with one another.

Figure 9:
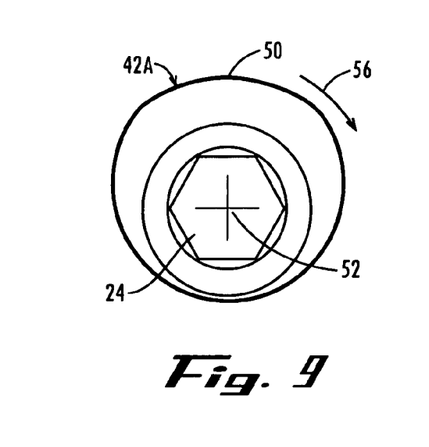
FIGS. 9-14 are progressive views of six circular hubs, showing how the lobes of each hub are circumferentially offset from the positions of the lobes of the adjacent hubs.

For example, FIG. 9 shows the lobe 50 of circular hub 42A in the uppermost position above the drive shaft 24. This indicates that the circular hub 42A has lifted its slicer wheel upwardly, in the direction away from engagement with the turf below. Thus, the slicer wheel of circular hub 42A no longer supports the weight of the turf slicer.

Figure 10:
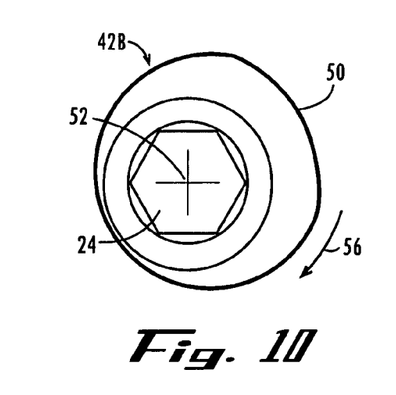

In the meantime, the lobe 50 of circular hub 42B in FIG. 10 is 60° beyond the position of lobe 50 of circular hub 42A of FIG. 9 so that it is now moving its slicer wheel downwardly toward engagement with the turf.

Figure 11:
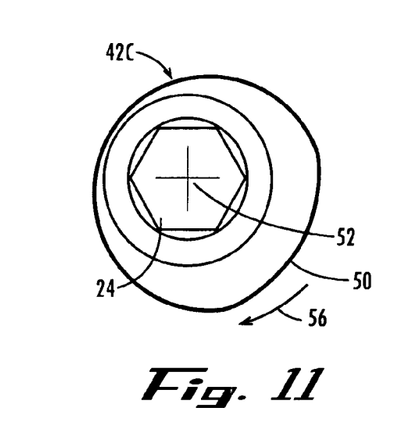

The lobe 50 of circular hub 42C in FIG. 11 is 60° is beyond the position of the lobe of circular hub 42B so that its lobe is now approaching bottom dead center and its slicer wheel is beginning to support the weight of the turf slicer.

Figure 12:
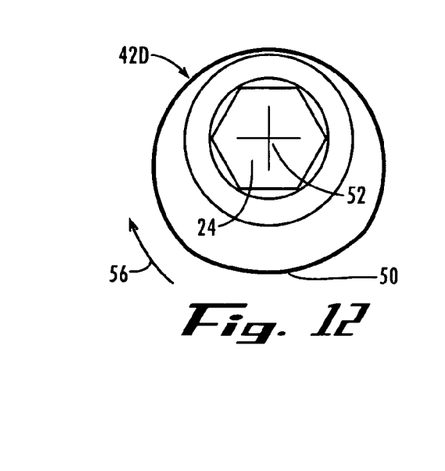

The lobe 50 of circular hub 42D in FIG. 12 is another 60° beyond that of hub 42C, at the bottom dead center position. This indicates that the slicer wheel of circular hub 42D is engaging at its deepest penetration in the turf and is supporting more weight than the other slicer wheels.

Figures 13, 14:
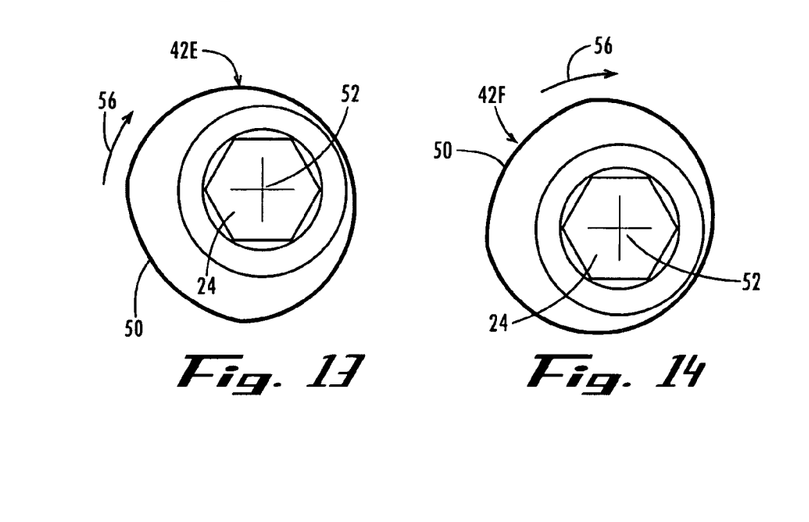

As shown in FIG. 13, the lobe 50 circular hub 42E has moved another 60° from the position of the circular hub 42D so that it is now lifting its slicer wheel away from maximum penetration in the turf, and the weight applied to the slicer wheel of the circular hub 42E is now being relieved and applied to the slicer wheel of circular hub 42D.

As shown in FIG. 14, the lobe 50 of circular hub 42F is now approaching top dead center so that its slicer blades are no longer supporting the weight of the turf slicer, thereby allowing its portion of the weight to be applied to the circular hub 42D and its slicer wheel.

With the arrangement illustrated and described, it will be understood that for every six slicer wheels mounted in the gang shown in FIGS. 1 and 2, one of the slicer wheels will support substantially more weight of the turf slicer than the other slicer wheels in the gang. This tends to accelerate the penetration of the gang of slicer wheels into the turf.

The drive shaft 24 that rotates the circular hubs 42A-42F is shown as being hexagonal. However, other non-circular shapes can be employed, such as octagonal, square, etc. The hexagonal shape is preferred so that a majority of the weight of the turf slicer is applied primarily to one of the six slicer wheels in the gang of six slicer wheels.

It should be understood that the rotation or "walking" of the slicer wheels is independent from the vertical oscillation of the slicer wheels, with the oscillation of the slicer wheels being imparted by the power from the tractor and the rotation of the slicer wheels being imparted by the advancement of the turf slicer across the turf. Thus, when the turf or other surface of the ground becomes more dense and difficult to penetrate, the forward motion of the turf slicer can be reduced and/or the velocity of rotation of the circular hubs increased so that more oscillation is applied to the slicer wheels for the duration of the slicer blades in the turf. Therefore, the aggressiveness of the turf slicer can be adjusted to meet the resistance of the turf or other ground surface that is being aerated. This can be accomplished without adjusting the weight of the turf slicer.

Although preferred embodiments of the invention have been disclosed in detail herein, it will be obvious to those skilled in the art that variations and modifications of the disclosed embodiments can be made without departing from the spirit and scope of the invention as set forth in the following claims.

We claim:

1. A turf slicer for penetrating and aerating turf, comprising:
    a support frame,
    a drive shaft rotatably supported by the support frame,
    power takeoff means arranged to rotate the drive shaft,
    a series of slicer wheels supported on the drive shaft, each of the slicer wheels including a series of substantially flat slicer blades extending radially about the drive shaft and oriented perpendicular to the drive shaft, the slicer wheels being freely rotatably supported on the drive shaft such that when the slicer wheels are lowered and some of the flat slicer blades of each slicer wheel contact the turf below the support frame and the support frame is advanced over the turf below the support frame the slicer wheels rotate freely about the drive shaft in response to the advancement of the support frame and penetrate the turf, and
    a circular hub mounting each slicer wheel to the drive shaft, each circular hub having an off center opening mounted to the drive shaft with a lobe protruding on one side of the off center opening and configured for oscillating the slicer wheels in an orbit perpendicular to the drive shaft in response to rotation of the drive shaft such that the flat slicer wheels more deeply penetrate the turf below the support frame,
    the lobes of adjacent ones of the circular hubs extending at different radial directions from the drive shaft, such that when the drive shaft is rotated the lobes of the circular hubs move about the drive shaft and cause the slicer wheels to oscillate in vertical planes about the drive shaft and penetrate downwardly into the turf below the support frame at different times from adjacent slicer wheels.

2. The turf slicer of claim 1, wherein the series of slicer wheels include duplicate slicer wheels each having radially extending flat slicer blades for penetrating the turf below the support frame.

3. The turf slicer of claim 1, wherein the drive shaft is non-circular in cross section.

4. The turf slicer of claim 3, wherein the drive shaft is hexagonal in cross section with flat surfaces formed about the perimeter of the drive shaft.

5. The turf slicer of claim 3, wherein the drive shaft is multilateral in cross section with flat surfaces formed about the perimeter of the drive shaft.

6. The turf slicer of claim 1, wherein the drive shaft is multilateral in cross section with flat surfaces formed about the perimeter of the drive shaft, and the lobes of adjacent ones of the circular hubs are oriented in alignment with different ones of the flat surfaces of the drive shaft.

7. A turf slicer for penetrating and aerating turf, comprising:
    a drive shaft,
    power means arranged to rotate the drive shaft,
    a series of slicer wheels mounted to the drive shaft and freely rotatable about the drive shaft,
    each slicer wheel including a plurality of radially extending flat slicer blades oriented substantially perpendicular to the drive shaft and extending radially at a right angle from the drive shaft and tapered to a narrow distal end for penetrating the turf,
    the slicer wheels being rotatably supported on the drive shaft such that when the slicer wheels are lowered into contact with turf below the support frame and the support frame is advanced over the turf the slicer wheels penetrate the turf and freely rotate about the drive shaft in response to the advancement of the support frame, and
    slicer wheel oscillator means for oscillating the slicer wheels in vertical planes about the drive shaft and out of phase with one another about the drive shaft, such that the slicer blades of different ones of the slicer wheels apply more force to the turf than the slicer blades of the other slicer wheels.

8. The turf slicer of claim 7, wherein:
    the slicer wheel oscillator means comprises a circular hub mounting each slicer wheel to the drive shaft, each circular hub having an off center opening mounted to the drive shaft with a lobe protruding on one side of the off center opening, the lobes of adjacent ones of the circular hubs extending at different radial directions from the drive shaft, such that when the drive shaft is rotated the lobes of the circular hubs rotate with the drive shaft and cause the slicer wheels to oscillate about the drive shaft and adjacent ones of the slicer wheels penetrate the turf at different times.

9. The turf slicer of claim 7, wherein the series of slicer wheels include duplicate slicer wheels each having radially extending flat slicer blades for penetrating the turf below the support frame.

10. The turf slicer of claim 7, wherein the drive shaft is non-circular in cross section.

11. The turf slicer of claim 7, wherein the drive shaft is hexagonal in cross section with flat surfaces formed about the perimeter of the drive shaft.

12. The turf slicer of claim 7, wherein the drive shaft is multilateral in cross section with flat surfaces formed about the perimeter of the drive shaft.

13. The turf slicer of claim 8, wherein the drive shaft is multilateral in cross section with flat surfaces formed about the perimeter of the drive shaft, and the lobes of adjacent ones of the circular hubs are oriented in alignment with different ones of the flat surfaces of the drive shaft.

14. A method of aerating soil, comprising:
    advancing a support frame on soil with the support frame having a drive shaft including a plurality of lobes extending in different radial directions about the drive shaft, supporting a slicer wheel on each lobe of the drive shaft with the slicer wheels having thin slicer blades radiating there from and penetrating the soil, while the thin slicer blades penetrate the soil and in response to advancing the support frame, rotating the slicer wheels freely about the lobes of the drive shaft such that the thin slicer blades of the slicer wheels walk through the soil, as the slicer wheels walk through the soil rotating the drive shaft and the lobes, in response to the rotation of the drive shaft and the lobes, oscillating the slicer wheels in vertical planes about the drive shaft with adjacent ones of the slicer wheels oscillating out of phase with each other and urging the thin slicer blades of adjacent slicer wheels into the soil at different times as the slicer wheels walk through the soil, and applying the weight of the support frame through the downwardly moving slicer wheels into the soil in response to rotating the drive shaft while raising others of the slicer wheels.

15. A turf slicer for penetrating and aerating turf, comprising:

a support frame, a drive shaft rotatably supported by said support frame, power takeoff means carried by said support frame arranged to rotate said drive shaft, a series of circular hubs mounted on said drive shaft for rotation in unison with said drive shaft, each said hub having an off center opening mounted to said drive shaft with a lobe protruding on one side of said center opening, said lobes of some of said circular hubs extending at different radial directions from said drive shaft than others of said circular hubs and configured for oscillating in an orbit perpendicular to said drive shaft in response to rotation of said drive shaft, a series of slicer wheels, each of said slicer wheels mounted on one of said circular hubs and freely rotatable about said circular hub, each of said slicer wheels including a series of slicer blades extending at different radial directions about said drive shaft and oriented perpendicular to said drive shaft for penetrating the turf below said support frame, said circular hubs configured for oscillating said slicer wheels in orbits perpendicular to said drive shaft in response to rotation of said drive shaft such that said slicer blades apply the weight of said support frame to less than all of said blades to more deeply penetrate the turf below said support frame, and said slicer wheels and said hubs being configured such that when some of said flat slicer blades of said slicer wheels contact the turf below said support frame and said support frame is advanced over the turf, said slicer wheels rotate freely about said circular hubs in response to the advancement of said support frame and penetrate the turf, and said slicer wheels move in an orbit about said drive shaft in response to the rotation of said drive shaft.

* * * * *

UNITED STATES PATENT AND TRADEMARK OFFICE
CERTIFICATE OF CORRECTION

PATENT NO. : 7,677,324 B2 Page 1 of 3
APPLICATION NO. : 11/500620
DATED : March 16, 2010
INVENTOR(S) : Donald C. Jones et al.

It is certified that error appears in the above-identified patent and that said Letters Patent is hereby corrected as shown below:

Delete title page showing an illustrative figure and substitute the attached title page therefor.

Delete drawing sheet 1 of 6 and substitute the attached sheet 1 of 6 therefor.

Applicant's mistake:
The duplicate #12 and its arrowhead at the top of Fig. 1 have been removed.
A copy of the corrected drawing is attached.

Signed and Sealed this

Eighth Day of June, 2010

David J. Kappos
*Director of the United States Patent and Trademark Office*

(12) United States Patent
Jones et al.

(10) Patent No.: US 7,677,324 B2
(45) Date of Patent: Mar. 16, 2010

(54) TURF SLICER WITH VERTICAL OSCILLATOR

(75) Inventors: Donald C. Jones, Tifton, GA (US);
Carroll J. Whitfield, Tifton, GA (US);
Robert Funk, Sycamore, GA (US)

(73) Assignee: First Products, Inc., Tifton, GA (US)

( * ) Notice: Subject to any disclaimer, the term of this patent is extended or adjusted under 35 U.S.C. 154(b) by 457 days.

(21) Appl. No.: 11/500,620

(22) Filed: Aug. 8, 2006

(65) Prior Publication Data
US 2008/0035355 A1 Feb. 14, 2008

(51) Int. Cl.
*A01B 33/02* (2006.01)
(52) U.S. Cl. .................... 172/97; 172/21; 172/125
(58) Field of Classification Search .............. 172/21, 172/22, 89, 94, 97, 125; 403/383
See application file for complete search history.

(56) References Cited

U.S. PATENT DOCUMENTS

| | | | | |
|---|---|---|---|---|
| 22,496 A | * | 1/1859 | Field | 172/89 |
| 131,160 A | * | 9/1872 | Forsgard | 172/97 |
| 1,171,798 A | * | 2/1916 | Malcor | 172/184 |
| 1,319,936 A | * | 10/1919 | Wentworth | 171/91 |
| 1,424,728 A | * | 8/1922 | Knight et al. | 111/128 |
| 1,479,188 A | * | 1/1924 | Larson | 172/54 |
| 1,702,707 A | * | 2/1929 | Sleffel | 172/21 |
| 2,034,505 A | * | 3/1936 | Cline | 172/21 |
| 2,205,752 A | * | 6/1940 | Silver | 172/63 |
| 2,206,264 A | * | 7/1940 | Rose | 172/21 |
| 2,539,053 A | * | 1/1951 | Blackledge | 172/549 |
| 2,827,751 A | * | 3/1958 | Mascaro | 56/249 |
| 2,881,847 A | * | 4/1959 | Strasel | 172/21 |
| 3,214,996 A | * | 11/1965 | Bono | 74/568 R |
| 3,292,946 A | * | 12/1966 | Melson | 280/229 |
| 3,739,856 A | * | 6/1973 | Ray | 172/21 |
| 3,747,687 A | * | 7/1973 | Bodine | 172/40 |
| 4,202,415 A | * | 5/1980 | Barlage | 172/125 |
| 4,204,576 A | * | 5/1980 | Mullet et al. | 172/22 |
| 4,364,423 A | * | 12/1982 | Schilling | 144/366 |
| 4,602,822 A | * | 7/1986 | Kim et al. | 301/1 |
| 4,724,662 A | * | 2/1988 | Giandenoto et al. | 56/256 |
| 5,142,852 A | * | 9/1992 | Nelson | 56/16.6 |
| 5,207,278 A | * | 5/1993 | Hatlen | 172/22 |
| 5,209,306 A | * | 5/1993 | Whitfield | 172/21 |
| 5,396,962 A | * | 3/1995 | Reincke | 172/604 |
| 6,561,282 B2 | * | 5/2003 | Smith | 172/21 |
| 6,607,039 B2 | * | 8/2003 | Simon | 172/22 |

(Continued)

*Primary Examiner*—Thomas B Will
*Assistant Examiner*—Jamie L McGowan
(74) *Attorney, Agent, or Firm*—Thomas, Kayden, Horstemeyer & Risley, LLP (57) ABSTRACT

A turf slicer includes a gang of six slicer wheels that "walk" through the turf in response to the forward motion of the turf slicer. In the meantime, the power takeoff from the tractor vertically oscillates the slicer wheels out of phase with one another, so that every sixth wheel is being thrust downwardly to bear most of the weight of the turf slicer as the other five wheels in the gang of six are either being withdrawn upwardly or moved downwardly and do not bear much weight, so that the weight of the turf slicer is concentrated on the downwardly moving slicer wheel that is approaching bottom dead center of its movement, thereby amplifying the effective weight of the turf slicer against the turf below.

15 Claims, 6 Drawing Sheets